United States Patent
Miyagi et al.

(10) Patent No.: US 7,184,611 B2
(45) Date of Patent: Feb. 27, 2007

(54) DATA RECORDING APPARATUS AND METHOD, DATA REPRODUCING APPARATUS AND METHOD, DATA RECORDING AND REPRODUCING APPARATUS AND METHOD, AND MAP IMAGE DATA FORMAT

(75) Inventors: Shiro Miyagi, Tokyo (JP); Yuuko Mimura, Tokyo (JP)

(73) Assignee: Sony Corporation (JP)

( * ) Notice: Subject to any disclaimer, the term of this patent is extended or adjusted under 35 U.S.C. 154(b) by 675 days.

(21) Appl. No.: 10/204,657

(22) PCT Filed: Dec. 25, 2001

(86) PCT No.: PCT/JP01/11339

§ 371 (c)(1),
(2), (4) Date: Nov. 26, 2002

(87) PCT Pub. No.: WO02/052840

PCT Pub. Date: Jul. 4, 2002

(65) Prior Publication Data

US 2003/0146985 A1 Aug. 7, 2003

(30) Foreign Application Priority Data

Dec. 26, 2000 (JP) .............................. 2000-395131

(51) Int. Cl.
*G06K 9/36* (2006.01)

(52) U.S. Cl. ...................... 382/291; 382/103; 382/106; 382/291; 701/207; 701/213

(58) Field of Classification Search ................ 382/282, 382/286, 291, 305, 103, 106; 701/2, 207, 701/213
See application file for complete search history.

(56) References Cited

U.S. PATENT DOCUMENTS

| 4,992,947 | A | * | 2/1991 | Nimura et al. ............... 701/210 |
| 5,115,398 | A | * | 5/1992 | De Jong ...................... 701/200 |
| 5,247,356 | A | * | 9/1993 | Ciampa ....................... 348/144 |
| 5,396,431 | A | * | 3/1995 | Shimizu et al. ............. 701/213 |

(Continued)

FOREIGN PATENT DOCUMENTS

JP 5-207408 A1 8/1993

(Continued)

*Primary Examiner*—Matthew C. Bella
*Assistant Examiner*—Yosef Kassa
(74) *Attorney, Agent, or Firm*—Lerner, David, Littenberg, Krumholz & Mentlik, LLP

(57) ABSTRACT

Latitudes and longitudes of first and second points on a measured map image are recorded together with an image file. First, a beginning of position information data of the map image is shown. Subsequently, it is shown that information of the first point is started. Subsequently, an X coordinate of the first point on the map image is shown. Subsequently, a Y coordinate of the first point on the map image is shown. Subsequently, the latitude of the first point is shown. Subsequently, the longitude of the first point is shown. Subsequently, it is shown that information of the second point is started. Subsequently, an X coordinate of the second point on the map image is shown. Subsequently, a Y coordinate of the second point on the map image is shown. Subsequently, the latitude of the second point is shown. Subsequently, the longitude of the second point is shown.

14 Claims, 19 Drawing Sheets

U.S. PATENT DOCUMENTS

| | | | |
|---|---|---|---|
| 5,414,462 A | * | 5/1995 | Veatch .................. 348/135 |
| 5,488,558 A | * | 1/1996 | Ohki ..................... 701/207 |
| 6,130,705 A | * | 10/2000 | Lareau et al. ............ 348/144 |
| 6,314,295 B1 | * | 11/2001 | Kawamoto .............. 455/456.2 |
| 6,523,025 B1 | * | 2/2003 | Hashimoto et al. ......... 707/3 |
| 6,539,421 B1 | * | 3/2003 | Appelman et al. ......... 709/206 |
| 6,738,973 B1 | * | 5/2004 | Rekimoto ................ 718/104 |
| 6,778,979 B2 | * | 8/2004 | Grefenstette et al. ......... 707/3 |

FOREIGN PATENT DOCUMENTS

| | | |
|---|---|---|
| JP | 2000-112342 A1 | 4/2000 |
| JP | 2001-257972 A1 | 9/2001 |

* cited by examiner

Fig. 9

```
<?xml version="1.0" encoding="Shift_JIS"?>
<!DOCTYPE sonypoix PUBLIC "-//MOSTEC//POIX V2.0//EN" "poix.dtd">       } 11
<sonypoix version="1.0">
<format>
    <datum>tokyo</datum>
    <unit>degree</unit>                                                } 12
    <time>1999-10-20T10:35:47+09:00</time>
</format>
<sonypoi>
    <index pos="+35.62222 +139.74528 14000000 fix tokyo"/>   ~ 13
    <poi>
        <point>
            <pos>
                <lat>35.62222</lat>
                <lon>139.74528</lon>
            </pos>
        </point>                                                       } 14
        <image href="../ ../dcim/100msdcf/dsc00001.jpg">
            <comment>Digital Still Camera 012</comment>
        </image>
    </poi>
    <category>14000000</category>   ~ 15
    <gpstime>1999-10-20T10:35:47+09:00</gpstime>   ~ 16
</sonypoi>
```

Fig. 10

| HEXADECIMAL CODE | ROUGH CLASSIFICATION |
|---|---|
| 00000000 | NOT CLASSIFIED |
| 01000000 | LEISURE SPOT |
| 02000000 | RESTAURANT |
| 03000000 | LODGING |
| 04000000 | TOURIST ATTRACTION · NOTED PLACE · HISTORIC SPOT |
| 05000000 | SHOP |
| 06000000 | SPORTS FACILITIES |
| 07000000 | FINANCIAL INSTITUTIONS |
| 08000000 | AUTOMOBILE-RELATED INSTITUTIONS |
| 09000000 | TRAFFIC INFORMATION |
| 0A000000 | STATION |
| 0B000000 | AIRPORT |
| 0C000000 | FERRY · PORT |
| 0D000000 | PUBLIC INSTITUTIONS |
| 0E000000 | HOSPITAL |
| 0F000000 | SCHOOL · EDUCATIONAL INSTITUTIONS |
| 10000000 | PLAN |
| 11000000 | RELIGIOUS FACILITIES |
| 12000000 | HOUSE |
| 13000000 | PERSONAL |
| 14000000 | PHOTOGRAPHING (RECORDING) PLACE |
| 15000000 | RESERVATION FOR BROADCASTING SERVICE |

| 21 | 22 | 23 | 24 |
|---|---|---|---|
| 35.62222 | 139.74528 | 14000000 | dsc00001.poi |
| 34.77823 | 139.35463 | 14000000 | dsc00002.poi |
| 35.62230 | 139.74550 | 14000000 | dsc00003.poi |
| 35.70856 | 139.74543 | 01000000 | nav00001.poi |
| 35.68405 | 139.72290 | 01000000 | nav00001.poi |
| 35.62020 | 139.75003 | 02000000 | nav00001.poi |

Fig. 17

| | DATA |
|---|---|
| SYMBOL SHOWING MAP IMAGE FORMAT | FMAP |
| VERSION OF FORMAT | 0100' |
| GEODETIC SYSTEM | 1 |
| SIZE OF MAP IMAGE · LATERAL | 1600 |
| SIZE OF MAP IMAGE · VERTICAL | 1200 |
| POSITION OF THE 1st POINT ON IMAGE · LATERAL | 0 |
| POSITION OF THE 1st POINT ON IMAGE · VERTICAL | 0 |
| SOUTH LATITUDE/NORTH LATITUDE OF THE 1st POINT | N' |
| LATITUDE OF THE 1st POINT | 35,37,20.25 |
| EAST LONGITUDE/WEST LONGITUDE OF THE 1st POINT | E' |
| LONGITUDE OF THE 1st POINT | 139,44,39.85 |
| POSITION OF THE 2nd POINT ON IMAGE · LATERAL | 1600 |
| POSITION OF THE 2nd POINT ON IMAGE · VERTICAL | 1200 |
| SOUTH LATITUDE/NORTH LATITUDE OF THE 2nd POINT | N' |
| LATITUDE OF THE 2nd POINT | 35,37,20.02 |
| EAST LONGITUDE/WEST LONGITUDE OF THE 2nd POINT | E' |
| LONGITUDE OF THE 2nd POINT | 139,44,41.05 |
| COPYRIGHT OF MAP DATA | ZZ Group |

Fig. 18

| 'F' | 'M' | 'A' | 'P' | '0' | '1' | '0' | '1' | '1' | '6' | '0' | '0' | '1' | '2' | '0' | '0' | '0' | '0' | '0' | '0' | '0' | '0' |
|---|---|---|---|---|---|---|---|---|---|---|---|---|---|---|---|---|---|---|---|---|---|

ID SYMBOL — Version ID — GEODETIC SYSTEM — SIZE OF MAP IMAGE · LATERAL/VERTICAL — POSITION OF THE 1st POINT · LATERAL/VERTICAL DIRECTION

| 'N' | '3' | '5' | '.' | '3' | '7' | '.' | '2' | '0' | '1' | '2' | '0' | '.' | '2' | '5' | 'E' | '1' | '3' | '9' | '.' | '4' | '4' | '.' | '3' | '9' | '.' | '8' | '5' |
|---|---|---|---|---|---|---|---|---|---|---|---|---|---|---|---|---|---|---|---|---|---|---|---|---|---|---|---|

SOUTH LATITUDE/NORTH LATITUDE OF THE 1st POINT — LATITUDE OF THE 1st POINT — EAST LONGITUDE/WEST LONGITUDE OF THE 1st POINT — LONGITUDE OF THE 1st POINT

| '1' | '6' | '0' | '0' | '1' | '2' | '0' | '0' | 'N' | '3' | '5' | '.' | '3' | '7' | '.' | '2' | '0' | '.' | '0' | '2' | . | . |
|---|---|---|---|---|---|---|---|---|---|---|---|---|---|---|---|---|---|---|---|---|---|

POSITION OF THE 2nd POINT · LATERAL/VERTICAL DIRECTION — SOUTH LATITUDE/NORTH LATITUDE OF THE 2nd POINT — LATITUDE OF THE 2nd POINT

Fig. 19

| | tag code | tag type | tag count |
|---|---|---|---|
| SYMBOL SHOWING MAP IMAGE FORMAT | 0x01 | Undefined | 4 |
| VERSION OF FORMAT | 0x02 | Undefined | 4 |
| GEODETIC SYSTEM | 0x03 | Short | 1 |
| SIZE OF MAP IMAGE · LATERAL | 0x04 | Long | 1 |
| SIZE OF MAP IMAGE · VERTICAL | 0x05 | Long | 1 |
| POSITION OF THE 1st POINT ON IMAGE · LATERAL | 0x06 | Long | 1 |
| POSITION OF THE 1st POINT ON IMAGE · VERTICAL | 0x07 | Long | 1 |
| SOUTH LATITUDE/NORTH LATITUDE OF THE 1st POINT | 0x08 | Ascii | 2 |
| LATITUDE OF THE 1st POINT | 0x09 | Rational | 3 |
| EAST LONGITUDE/WEST LONGITUDE OF THE 1st POINT | 0x0a | Ascii | 2 |
| LONGITUDE OF THE 1st POINT | 0x0b | Rational | 3 |
| POSITION OF THE 2nd POINT ON IMAGE · LATERAL | 0x0c | Long | 1 |
| POSITION OF THE 2nd POINT ON IMAGE · VERTICAL | 0x0d | Long | 1 |
| SOUTH LATITUDE/NORTH LATITUDE OF THE 2nd POINT | 0x0e | Ascii | 2 |
| LATITUDE OF THE 2nd POINT | 0x0f | Rational | 3 |
| EAST LONGITUDE/WEST LONGITUDE OF THE 2nd POINT | 0x10 | Ascii | 2 |
| LONGITUDE OF THE 2nd POINT | 0x11 | Rational | 3 |
| COPYRIGHT OF MAP DATA | 0x12 | Ascii | any |

DATA RECORDING APPARATUS AND METHOD, DATA REPRODUCING APPARATUS AND METHOD, DATA RECORDING AND REPRODUCING APPARATUS AND METHOD, AND MAP IMAGE DATA FORMAT

TECHNICAL FIELD

The invention relates to data recording apparatus and method, data reproducing apparatus and method, data recording and reproducing apparatus and method, and a map image data format, in which together with images recorded onto a recording medium, data concerned with the images can be recorded and the images and the data concerned with the images can be reproduced from the recording medium and displayed.

BACKGROUND ART

Hitherto, for example, a digital still camera has been known as an apparatus which can digitally record and reproduce an image. As one of use methods of the digital still camera, there has been proposed a method whereby position information (latitude, longitude) of a photographing spot is obtained and recorded onto a recording medium together with image data, and when the image data reproduced from the recording medium is displayed, the position information is displayed onto a reproduction picture plane by a numerical value. In the digital still camera, when the user wants to use a map image, it is necessary to prepare map images having position information onto the recording medium.

However, there is a problem such that even when there is means for obtaining present position information, if the present location is out of a range of the prepared map, the map cannot be used and the obtained position information cannot be effectively handled.

Also in case of preparing map images having the position information, as a present situation, a special modification is necessary and the map images cannot be easily obtained.

Further, in the digital still camera, a map image format in which map images can be recorded onto a removable recording medium and used does not exist. A map image format in which a latitude and a longitude of arbitrary one point on a map can be used does not exist, either. In the digital still camera, therefore, a map image format which is used to display a map image so as to be overlaid onto an image having other latitude and longitude or a latitude and a longitude of a present location or the like does not exist.

It is, therefore, an object of the invention to provide data recording apparatus and method, data reproducing apparatus and method, data recording and reproducing apparatus and method, and a map image data format, in which not only a recording and reproducing function of images can be provided but also a latitude and a longitude of arbitrary one point on a map image recorded as a map onto a recording medium can be displayed by a single portable photographing apparatus.

DISCLOSURE OF INVENTION

According to the invention of Claim 1, there is provided a data recording apparatus which has a portable construction and records a digital image signal onto a recording medium, comprising: signal processing means for forming image data from an image pickup signal which is obtained from image pickup means; a display unit for displaying the image data; position selecting means for selecting a position on the image data displayed on the display unit and obtaining first position information regarding the selected position; position measuring means for obtaining second position information by measuring a position at the position where the first position information has been obtained; and recording means for recording two or more position information data each consisting of the first and second position information together with the image data onto the recording medium.

According to the invention of Claim 5, there is provided a data recording method which has a portable construction and records a digital image signal onto a recording medium, comprising the steps of: forming image data from an image pickup signal which is obtained from image pickup means; displaying the image data onto a display unit; selecting a position on the image data displayed on the display unit and obtaining first position information regarding the selected position; obtaining second position information by measuring a position at the position where the first position information has been obtained; and recording two or more position information data each consisting of the first and second position information together with the image data onto the recording medium.

According to the invention of Claim 9, there is provided a data reproducing apparatus which has a portable construction, reproduces a digital image signal from a recording medium, and displays the signal, comprising: signal processing means for forming image data from either an image pickup signal which is obtained from image pickup means or the digital image signal which is read out from the recording medium; and a display unit for displaying the image data, wherein if there are two or more position information data each consisting of first position information on the image data displayed on the display unit and second position information obtained by measuring a position at a position where the first position information has been obtained, the second position information at an arbitrary position on the image data is calculated on the basis of the position information data.

According to the invention of Claim 13, there is provided a data reproducing method which has a portable construction, reproduces a digital image signal from a recording medium, and displays the signal, comprising the steps of: forming image data from either an image pickup signal which is obtained from image pickup means or the digital image signal which is read out from the recording medium; and displaying the image data onto a display unit, wherein if there are two or more position information data each consisting of first position information on the image data displayed on the display unit and second position information obtained by measuring a position at the position where the first position information has been obtained, the second position information at an arbitrary position on the image data is calculated on the basis of the position information data.

According to the invention of Claim 17, there is provided a data recording and reproducing apparatus which has a portable construction, records a digital image signal onto a recording medium, reproduces the digital image signal from the recording medium, and displays the signal, comprising: signal processing means for forming image data from either an image pickup signal which is obtained from image pickup means or the digital image signal which is read out from the recording medium; a display unit for displaying the image data; position selecting means for selecting a position on the image data displayed on the display unit and obtaining first position information regarding the selected position; position measuring means for obtaining second position information by measuring a position at the position where the first position information has been obtained; recording means for recording two or more position information data each consisting of the first and second position information together with the image data onto the recording medium; and reading means for reading out the image data and the position information data from the recording medium, wherein the image data read out from the recording medium is displayed on the display unit, and when the two or more position information data exists on the image data displayed on the display unit, the second position information at an arbitrary position on the image data is calculated on the basis of the position information data.

According to the invention of Claim 22, there is provided a data recording and reproducing method which has a portable construction, records a digital image signal onto a recording medium, reproduces the digital image signal from the recording medium, and displays the signal, comprising the steps of: forming image data from either an image pickup signal which is obtained from image pickup means or the digital image signal which is read out from the recording medium; displaying the image data onto a display unit; selecting a position on the image data displayed on the display unit and obtaining first position information regarding the selected position; obtaining second position information by measuring a position at the position where the first position information has been obtained; recording two or more position information data each consisting of the first and second position information together with the image data onto the recording medium; and reading out the image data and the position information data from the recording medium, wherein the image data read out from the recording medium is displayed on the display unit, and when the two or more position information data exists on the image data displayed on the display unit, the second position information at an arbitrary position on the image data is calculated on the basis of the position information data.

According to the invention of Claim 27, there is provided a map image data format which is constructed by two or more position information data, wherein the position information data comprises first position information which is obtained with respect to a position selected on a displayed map image and second position information which is obtained by measuring a position at the position where the first position information has been obtained.

The map image which is formed from either the image pickup signal which is obtained from the image pickup means or the digital image signal which is read out from the recording medium is displayed on the display unit. The position on the map image is selected. The position information data is constructed by the selected position and the position information comprising the latitude and the longitude. The two or more position information data is recorded onto the recording medium together with the map image. With respect to the map image and the position information data which were read out from the recording medium, the map image is displayed on the display unit. If two or more position information data is included in a display area of the display unit, the second position information at an arbitrary position on the display area can be calculated.

BRIEF DESCRIPTION OF DRAWINGS

FIG. 9 is a schematic diagram showing an example of a position information file according to POIX in the embodiment of the invention.

FIG. 10 is a schematic diagram showing regulations of category codes in the embodiment of the invention.

FIG. 17 shows an example of position information in the embodiment of the invention.

FIG. 18 shows an example of description of position information in the embodiment of the invention.

FIG. 19 shows another example of position information in the embodiment of the invention.

BEST MODE FOR CARRYING OUT THE INVENTION

Figure 1:
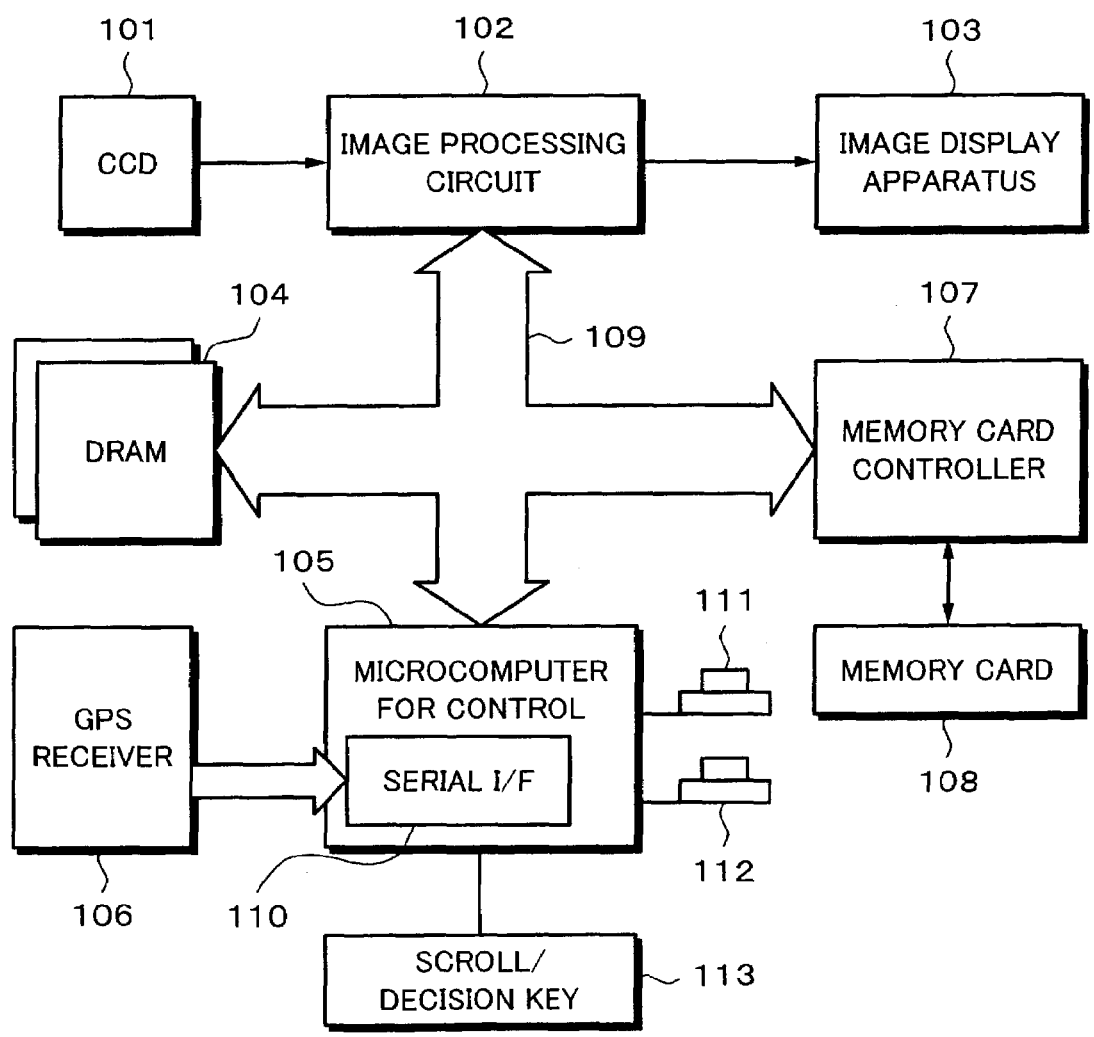
FIG. 1 is a block diagram of an embodiment of the invention.

An embodiment of the invention will be described hereinbelow with reference to the drawings. Component elements having the same functions as those in the diagrams are designated by the same reference numerals, thereby avoiding their overlapped descriptions. FIG. 1 shows a system construction of an embodiment to which the invention is applied. The embodiment is obtained by applying the invention to a digital still camera having a GPS (Global Positioning System) function. Reference numeral 101 denotes a CCD (Charge Coupled Device). The CCD 101 generates an object image obtained via a lens portion (not shown) as an image pickup signal. The image pickup signal is supplied to an image processing circuit 102.

The image processing circuit 102 comprises a camera signal processing unit, a memory controller, an image compression/decompression unit, a buffer for display, a D/A converter, and the like. The camera signal processing unit includes a clamping circuit, a luminance signal processing circuit, an outline correcting circuit, a defect compensating circuit, an automatic aperture control circuit, an automatic focusing control circuit, an automatic white balance correcting circuit, and the like. The buffer memory for display and a data transmission path 109 are connected to the memory controller. An output of the display buffer memory is supplied to an image display apparatus 103 via the D/A converter.

The image compression/decompression unit compresses the image data by, for example, the JPEG (Joint Photographic Experts Group) and decompresses the compressed image data. The image display apparatus 103 is constructed by a display device such as an LCD (Liquid Crystal Display) or the like provided integratedly with the camera. An image signal from the image processing circuit 102 is supplied to the image display apparatus 103, so that an image which is being photographed is displayed and an image read out from a removable recording medium, for example, a memory card 108 is displayed.

A DRAM (Dynamic Random Access Memory) 104, a microcomputer for control (microcomputer) 105, and a memory card controller 107 are connected to the data transmission path 109. The writing and reading operations of data to/from the memory card 108 are executed by the memory card controller 107. The memory card 108 has therein a flash memory, a buffer memory, and a memory controller and is detachable from the digital still camera main body. As a recording medium, it is not limited to the memory card but a floppy disk, a rewritable optical disk, or the like can be also used.

An enlargement switch 111, a reduction switch 112, and a scroll/decision key 113 are connected to the microcomputer 105 for control. Although not shown, in addition to those switches, various switches such as shutter button, switch to designate an operating mode, and the like which are operated by the photographer are provided. The enlargement switch 111 is used to enlarge the image which is displayed onto the image display apparatus 103. For example, each time the enlargement switch 111 is pressed, the image is enlarged by 10%. On the contrary, the reduction switch 112 is used to reduce the image. Each time the reduction switch 112 is pressed, the image is reduced by 10%. In the embodiment, the reduction switch 112 is used to reduce the enlarged image and the minimum size is set to the equal magnification.

Position information (a latitude and a longitude of the present position) from a GPS unit 106 is supplied to the microcomputer 105 for control via a serial interface 110. The GPS unit 106 arithmetically operates the latitude and longitude of the present position by receiving radio waves from a plurality of GPS satellites. For example, the GPS unit 106 generates valid latitude and longitude information at an interval of one second.

When the photographer presses the shutter button, the image signal photographed by the CCD 101 is supplied to the image processing circuit 102. The image data obtained after a camera signal process was executed is stored into the DRAM 104 by a control of the memory controller in the image processing circuit 102. When the shutter button is pressed, the GPS unit 106 measures the latitude and longitude of the present position (that is, photographing spot). The latitude and longitude information is stored from the GPS unit 106 to the DRAM 104 via the serial interface 110 of the microcomputer 105 for control and the data transmission path 109.

When the photographed original image data is stored into the DRAM 104, the original image data is compressed by the image compression/decompression unit in the image processing circuit 102 under the control of the microcomputer 105. The compressed image data (JPEG data) is stored into the DRAM 104. In this case, the compressed image data is stored into another area different from an area in which the original image data has been stored. The compressed image data read out from the DRAM 104 by the microcomputer 105 is written into the memory card 108 via the memory card controller 107.

When an image such as a still image or the like stored in the memory card 108 is reproduced, the compressed image data is read out from the memory card 108 via the memory card controller 107 and decompressed by the image compression/decompression unit in the image processing circuit 102. The decompressed image data is written into the DRAM 104. The image data stored in the DRAM 104 is displayed onto the image display apparatus 103 via the image processing circuit 102.

Figure 2:
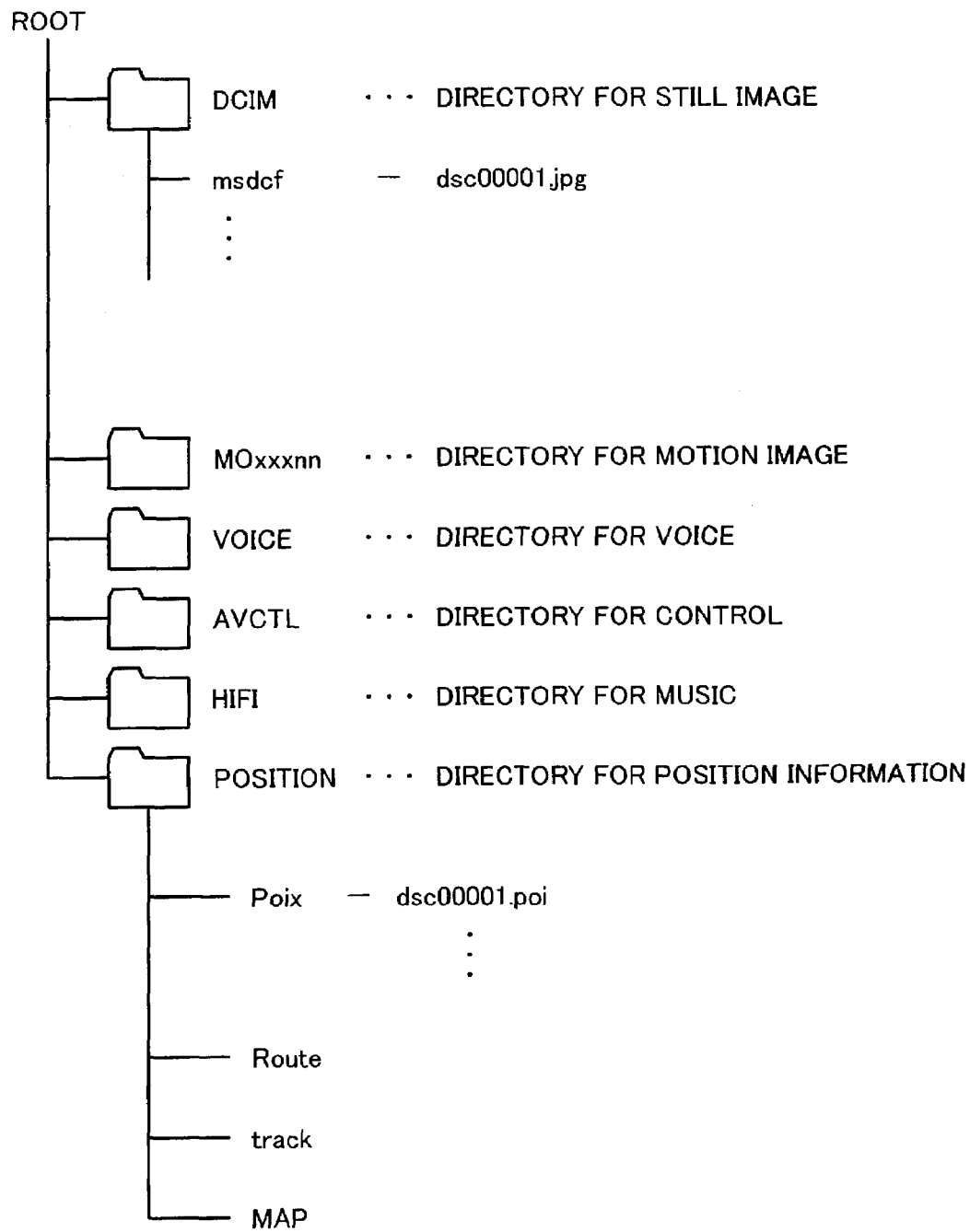
FIG. 2 is a schematic diagram showing a file construction of a memory card in the embodiment of the invention.

The memory card 108 has, for example, a file construction shown in FIG. 2. As directories, a directory for a still image (DCIM), a directory for a motion image (MOxxxnn), a directory for voice (VOICE), a directory for control (AVCTL), a directory for music (HIFI), and a directory for the position information (POSITION) exist. A sub-directory has been specified for each directory. For example, the sub-directory such as msdcf or the like has been specified for the directory for a still image (DCIM). For instance, in case of one image which has been photographed by the digital still camera and compressed by the JPEG, a file name and an extension of "dsc00001.jpg" are added to the sub-directory "msdcf".

As sub-directories of the directory for the position information, Poix (position information data), Route (route data), track (track data), MAP (map data), and the like have been specified. For example, in case of the position information of a photographing spot at the time when an object is photographed by the digital still camera, a position information file having a file name "dsc0001.poi" or the like exists under Poix. An extension "poi" shows that such a file is a position information file according to POIX. In the position information file, one position information corresponds to one file. One MAP file belonging to the sub-directory "MAP" comprises one or a plurality of map data. The map data is downloaded into the memory card 108 from a car navigation system, a map database, or the like.

The microcomputer 105 for control in which desired programs have previously been stored knows such a file structure in the memory card 108. When the photographed still image data is written into the memory card 108, a file name is added to the still image data to be written. When desired still image data is read out from the memory card 108, the file name of such still image data is designated.

Further, as mentioned above, when the shutter button is pressed, the position information (latitude, longitude) of the photographing spot fetched into the DRAM 104 is written in the memory card 108 by the microcomputer 105 for control via the memory card controller 107. As a method of recording the position information into the memory card 108, there are a method of recording the position information as another file different from the image file and a method of directly recording the position information into the image file.

As an example of recording it as another file, there is a method of using a position information file in a data format according to the POIX (Point Of Interest exchange language). The POIX is a data format which has been specified in MOSTEC (Mobile Information Standard TEchnical Committee) and formed for the purpose of exchanging position information on the Internet. POIX denotes a markup language formed in accordance with the XML (extensible Markup Language) as a base. Data is layer-structured by using tags and described. The layer structure has been specified in the POIX. The position information denotes a target position and position-related information.

That is, the position information is converted into a position information file in a data format according to the POIX by the microcomputer for control 105 and recorded as a file of the sub-directory Poix into the memory card 108. For example, an image file name to be linked can be described in the position information file. Therefore, the file of the photographed image and the position information of the photographing spot can be linked.

Figure 3:
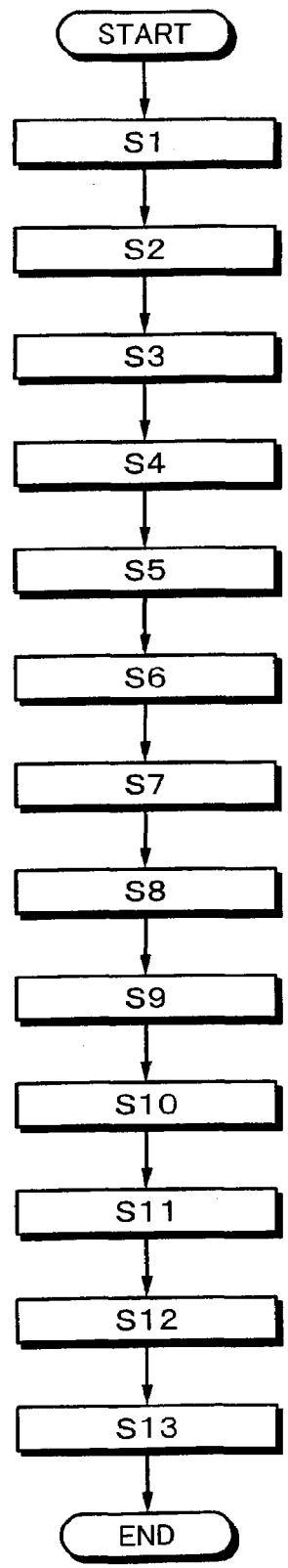
FIG. 3 is a flowchart for explaining processes for obtaining position information in the embodiment of the invention.

An example in which, in order to allow the map data to have the position information, position information of two points which are away from each other by a certain necessary distance with respect to a size of display area of the map is obtained will now be described with reference to a flowchart of FIG. 3. In step S1, first, a cursor is moved to a landmark of the first point existing on the displayed map image. A map whose upper side is directed due north will now be explained as an example. In step S2, the apparatus is set into a mode for obtaining the position information of the first point to which the cursor has been moved.

Figure 4:
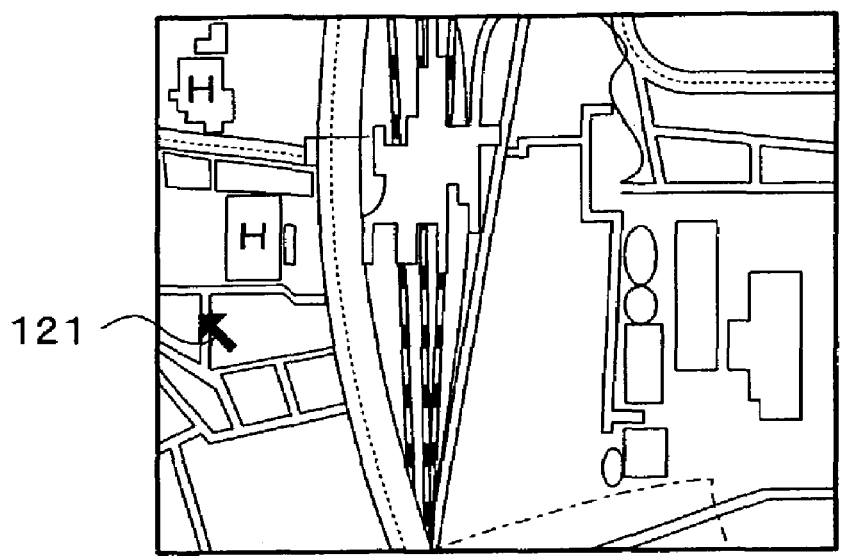
FIG. 4 is a schematic diagram of an example of a map image which is displayed in the embodiment of the invention.
Figure 5:
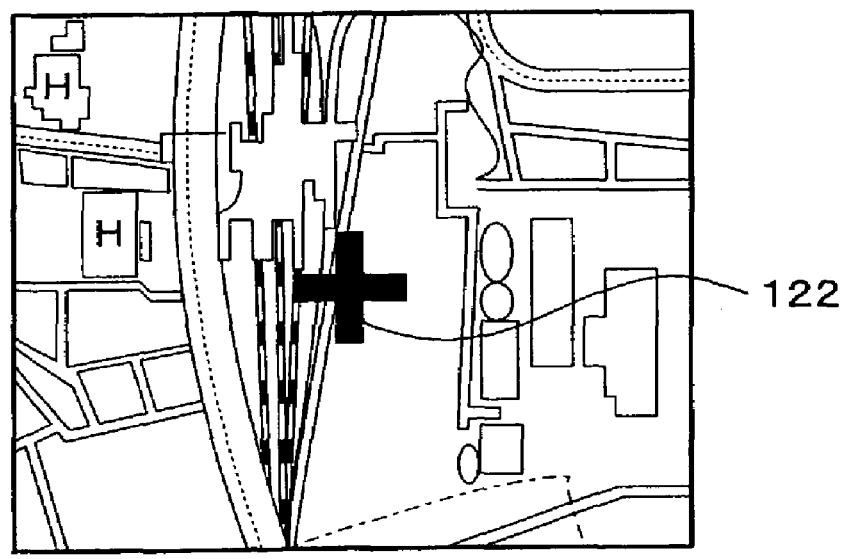
FIG. 5 is a schematic diagram of an example of a map image which is displayed in the embodiment of the invention.

In step S3 a present place on the map image is selected. As one of methods of selecting the present place, as shown in FIG. 4, there is a method whereby a cursor 121 is prepared onto the map image and the present place is selected so as to move the cursor 121 onto the present place on the map image by using the scroll/decision key 113. On the other hand, as shown in FIG. 5, it is also possible to use a method whereby the present place is selected so as to move the whole map image by using the scroll/decision key 113 so that the present place is positioned at a fixed position 122, for example, a center on the map image without using the cursor 121. The fixed position 122 is not limited to the center but can be set to an arbitrary position so long as it is a certain fixed position on the map image. Furthermore, the present place can be also directly selected in a manner like a touch panel. That is, any means can be used so long as it can select the present place.

In step S4, the selected present place is recorded into the DRAM 104. In step S5, position information comprising the latitude and longitude of the present place is obtained from the GPS receiver 106. In step S6, the obtained position information is recorded as a latitude and a longitude of the first point into the DRAM 104 together with the present place position on the map image.

Subsequently, a combination of the present place position on the map image and the latitude and longitude of the present place is assumed to be position information data at that point. If the position information data can be reproduced, the recorded position information data is recorded as a part of the image file or a format of another file into the memory card 108 via the memory card controller 107 by the microcomputer 105 for control. Thus, a power source can be turned off after the first point was measured.

In step S7, the cursor is moved to a landmark of the second point on the map image in which both latitude and longitude are away from the first point by a distance longer than a necessary distance. Instep S8, the apparatus is set into a position measuring mode to obtain position information of the second point to which the cursor has been moved. In step S9, the present place on the map image is selected. In step S10, the selected present place is recorded into the DRAM 104. In step S11, the position information comprising the latitude and longitude of the present place is obtained from the GPS receiver 106. In step S12, the obtained position information is recorded as a latitude and a longitude of the second point into the DRAM 104 together with the present place on the map image.

In step S13, the newly obtained position information data of the second point is added to the position information data of the first point by the microcomputer 105 for control. The measured position information data of the first and second points is recorded into the DRAM 104. The position information data of the first and second points is again recorded into the memory card 108 as a part of the image file or as another file different from the image file. For example, the image file and the position information data of the first and second points are shown in FIG. 6.

The position information at the upper left and lower right positions or the lower left and upper right positions of the map image obtained from the first and second points can be also recorded into the DRAM 104. In this case, the position information at the upper left and lower right positions or the lower left and upper right positions is again recorded into the memory card 108 as a part of the image file or as another file different from the image file. For example, the image file and the position information of the upper left and lower right positions or the lower left and upper right positions are shown in FIG. 7.

Figure 6:
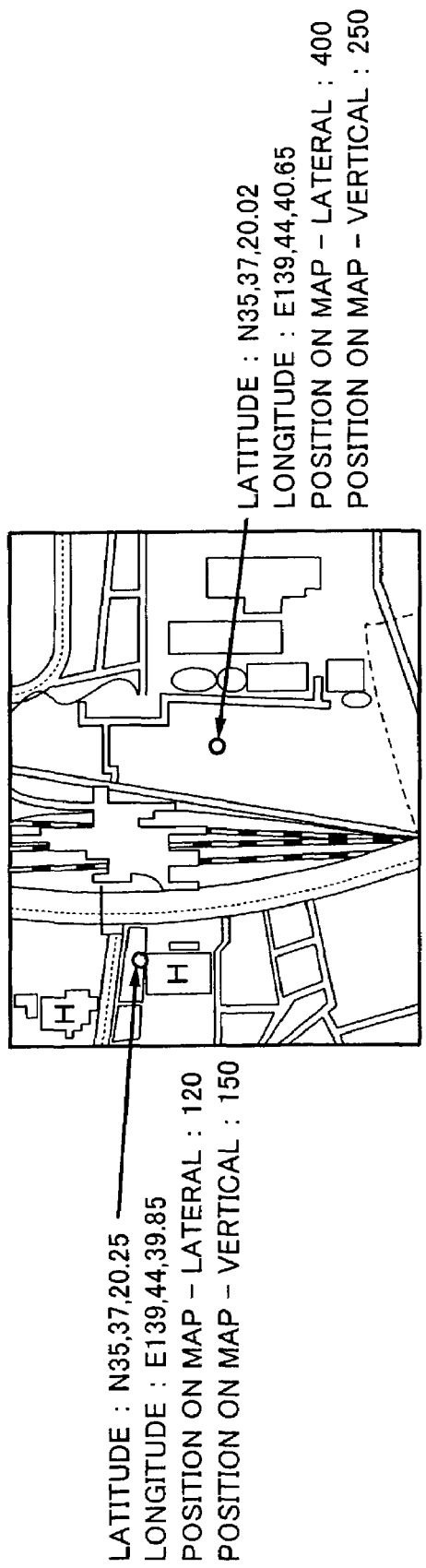
FIG. 6 is a schematic diagram of an example of a map image which is displayed in the embodiment of the invention.
Figure 7:
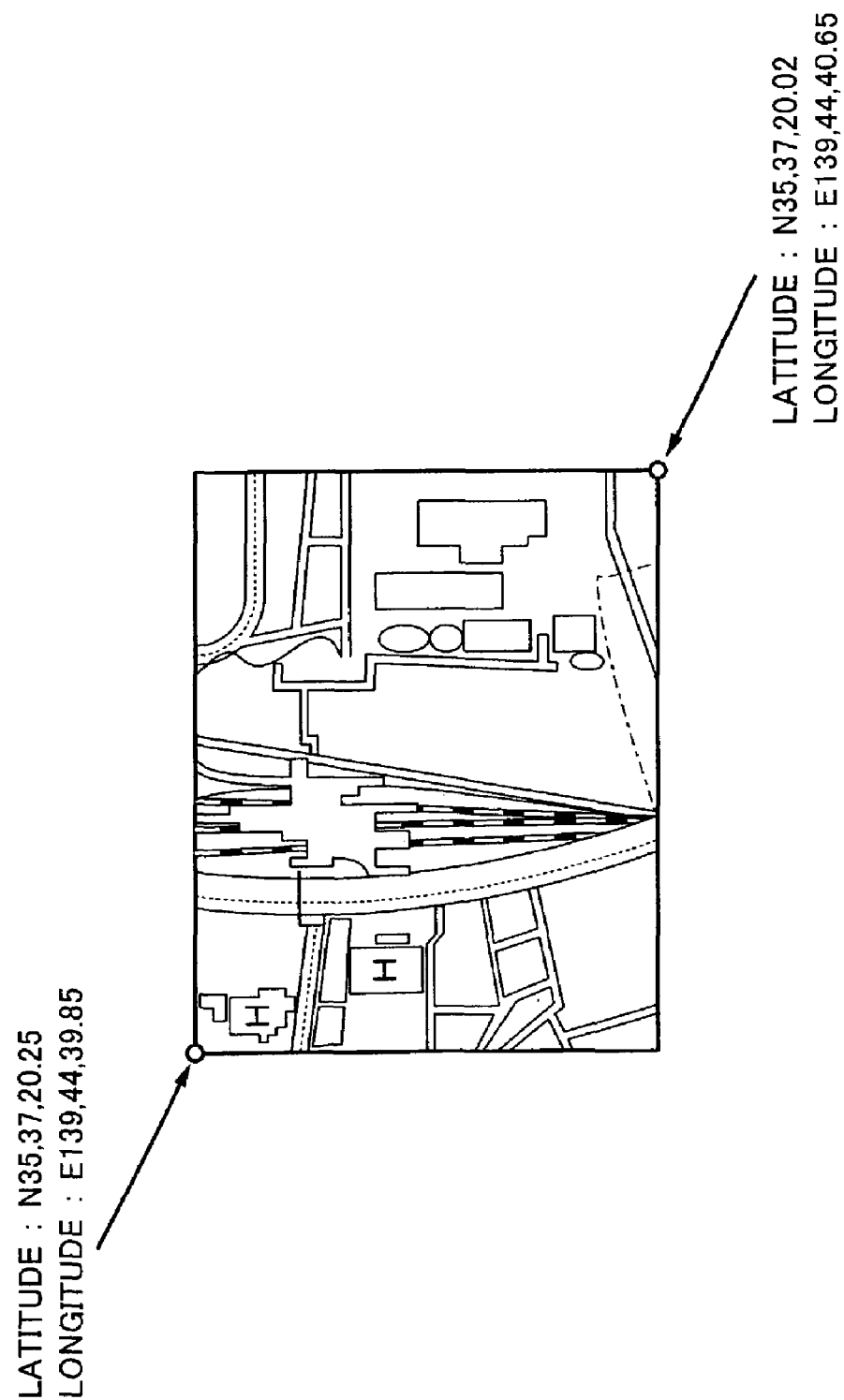
FIG. 7 is a schematic diagram of an example of a map image which is displayed in the embodiment of the invention.

The position information data recorded in the memory card 108 as shown in FIGS. 6 and 7 as mentioned above can be used. The position information data can be used in a state where it has been recorded in the DRAM 104 without being recorded into the memory card 108.

If the power source is turned off in the case where the position information data of the first point is recorded into the DRAM 104 and at least the position information data of the first point can be reproduced, the position information data of the first point is read out from the memory card 108 as a part of the recorded image file or as another file different from the image file at this time point and recorded into the DRAM 104.

As mentioned above, it is possible to allow the map image to have the position information comprising the latitudes and longitudes of the first and second points. The image file serving as a map image can be prepared in the memory card 108 or can be also newly obtained.

Figure 8:
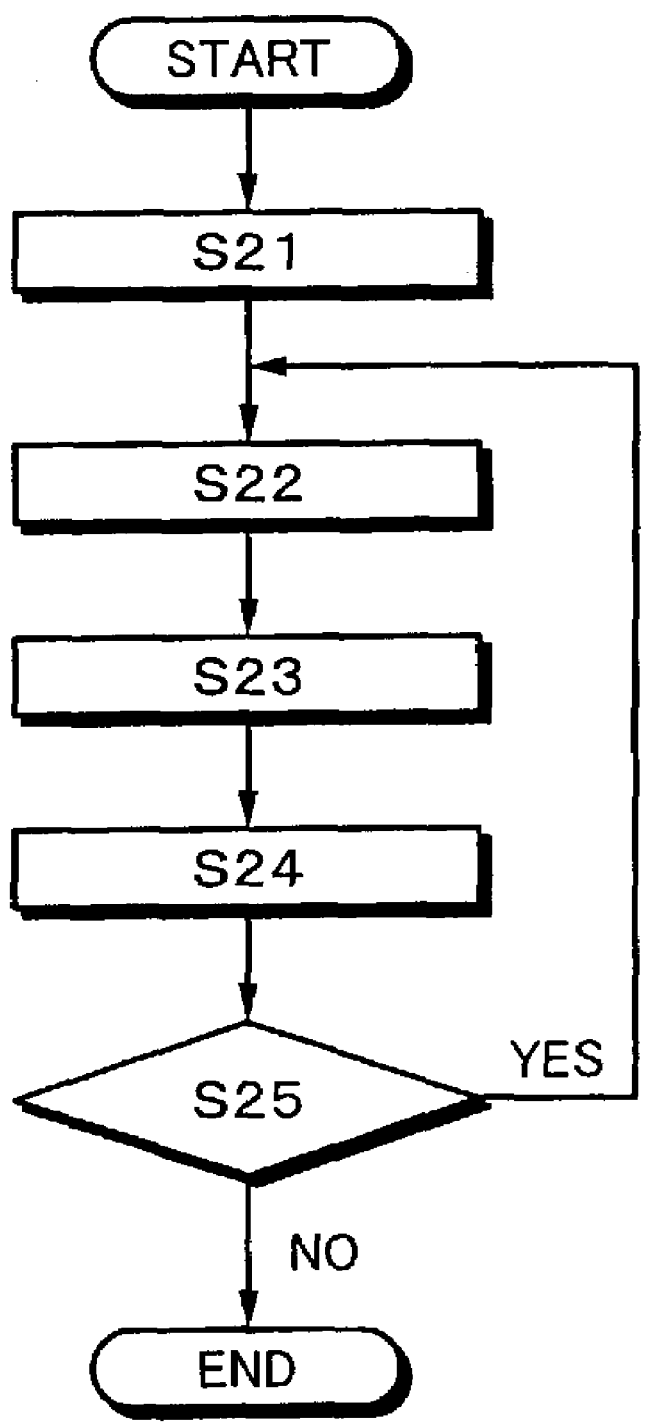
FIG. 8 is a flowchart for explaining processes for forming a latitude and longitude table of the position information in the embodiment of the invention.
Figure 13:
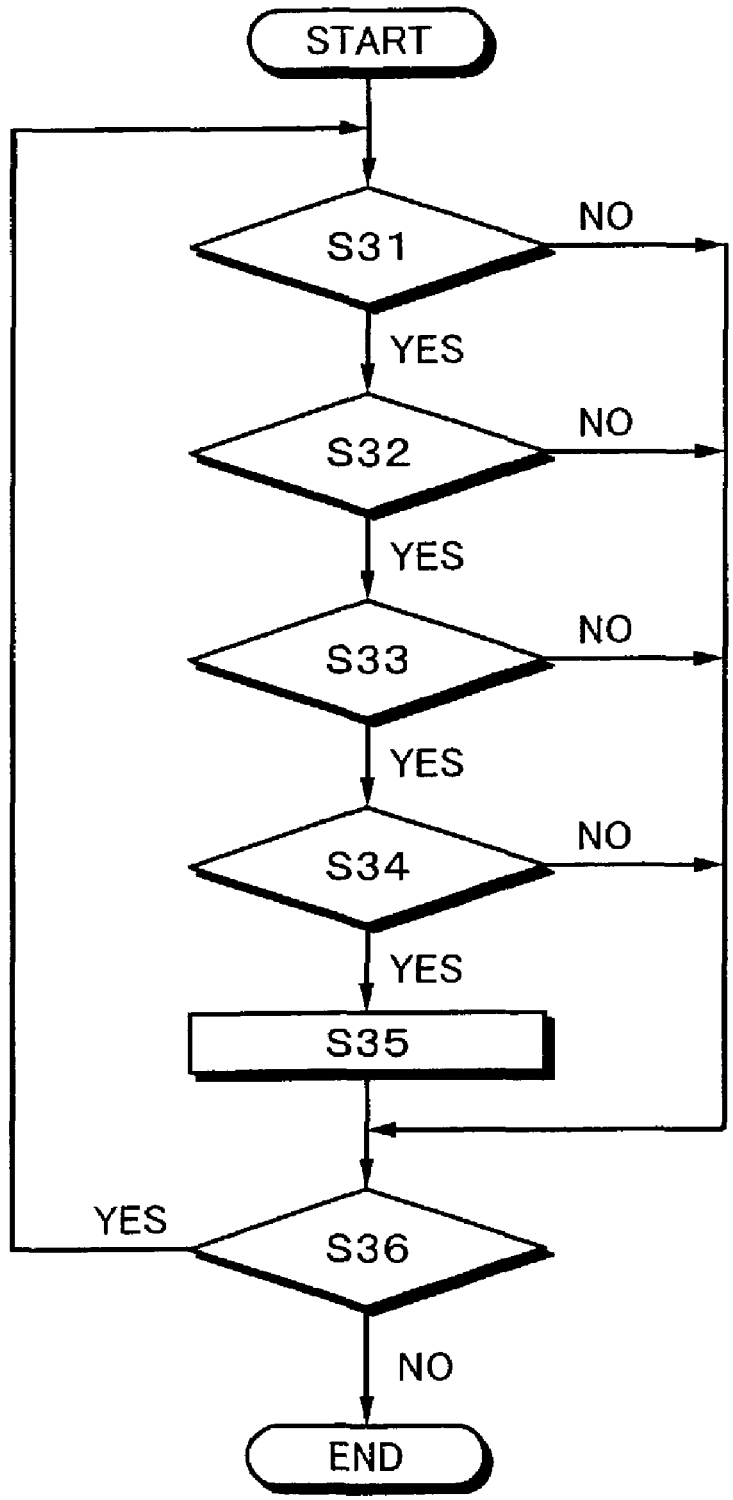
FIG. 13 is a flowchart for explaining the process for displaying the icon in the embodiment of the invention.

An example in which the photographing spot or the like of the image is displayed as an icon onto the displayed map image will now be described with reference to flowcharts of FIGS. 8 and 13. In step S21, first, the compressed image data is read out from the memory card 108 via the memory card controller 107 and decompressed by the image compression/decompression unit in the image processing circuit 102. The decompressed image data is written into the DRAM 104. The image data stored in the DRAM 104 is processed by the image processing circuit 102 and, subsequently, displayed onto the image display apparatus 103. In step S22, the position information file recorded in the memory card 108 is read out via the memory card controller 107 and recorded into the DRAM 104.

In step S23, an index tag showing index information is searched from the position information file recorded in the DRAM 104 by the microcomputer 105 for control. An example of the position information file is shown in FIG. 9. An index tag (<index pos="+35.62222+139.74528 14000000 fix Tokyo"/>) of the 10th line is searched from this position information file. In step S24, the latitude and longitude recorded in the index tag are obtained and written into a latitude/longitude table, which will be explained hereinlater.

In step S25, when a plurality of position information files exist, whether the reading has been finished for all of the position information files or not is discriminated. If it is determined that the position information file which is not read out yet exists, the control routine is returned to step S22. If it is determined that the reading of all of the position information files has already been finished, the control routine of the flowcharts is finished.

An example of a position information file which is formed by the microcomputer 105 for control and conforms with the POIX is shown in FIG. 9. In the example of FIG. 9, a version number of the POIX which is used is described in a portion of the first three lines shown at reference numeral 11. It is also shown that an expansion (sonypoix) proposed by the applicant of the present invention is included, and its version number is also described. A portion of the next five lines shown at 12 is a portion describing elements of format information (format). In the format information, it is shown that a geodetic system (datum) used in the described POIX is (tokyo: Japanese geodetic system), it is also shown that a coordinate system (unit) which is used is (degree), and further, it is shown that an information creation date (time) is Oct. 20, 1999, 10 (hours):35 (minutes):47 (seconds)+09: 00 (time zone). In the POIX, the elements are not limited to the format information but the following items have been specified: that is, an altitude; a moving state of a mobile object; a moving direction; a locus coordinate point sequence; a name of a target; an explanation of the target; an accessing method to the target; an introducing spot; an arrival spot; a path from the introducing spot to the arrival spot; a communicating destination; and the like.

An index for search (index pos) has been described in a portion of the 10th line shown at 13 every subsequent POI (Point Of Interest) element. That is, the index having the position information is described so as to overlap with the position information (latitude, longitude).

The position information (latitude, longitude), a category of the information (category), distinction between the mobile object and a non-mobile object, and the geodetic system are included in the tag of an index for search. In the example of FIG. 9, the position is set to the north latitude (35.62222 degree) and the east longitude (139.74528 degree), a category code is set to 14000000, the object is the non-mobile object (fix), and the geodetic system is the Japanese geodetic system (tokyo). Digit numbers of the latitude and longitude are fixed. In the format of the POIX, either a degree indication or a degree·minute·second indication can be selected. However, in the index, a display mode is set to the degree indication. By fixing the digit number and the display format as mentioned above, the reading operation of the index and the conversion into the internal format of the apparatus can be executed at a high speed.

The POI information has been described in a portion of the next 11 lines shown at 14. That is, a representative point (point) of the target has been expressed by the position (pos). The position is described by the latitude (lat) and longitude (lon). The same position as that described in the foregoing index has been described. As (image href), a link position and a file name of the image file which is linked to the POI have been described. The file name conforms with the directory structure of the memory card mentioned above. As for (comment), a character string of a comment on the image which is linked to the POI is expressed. In the example of FIG. 9, a model name of the digital still camera which obtained the image is shown.

Further, (category) of the next line shown at 15 expresses the category of the POI. (gpstime) of the further next line shown at 16 denotes time and date of reception of time information which is transmitted from a GPS satellite. As shown in FIG. 10, the category is a code of 4 bytes and numerals of the hexadecimal notation are shown as a character string. Rough classification of the category is expressed by one head byte of the category code. (14000000) of the category code in FIG. 9 indicates position information of a photographing (recording) place. By using the category code, for example, a different shape of the icon can be set every category.

Figures 11, 12:
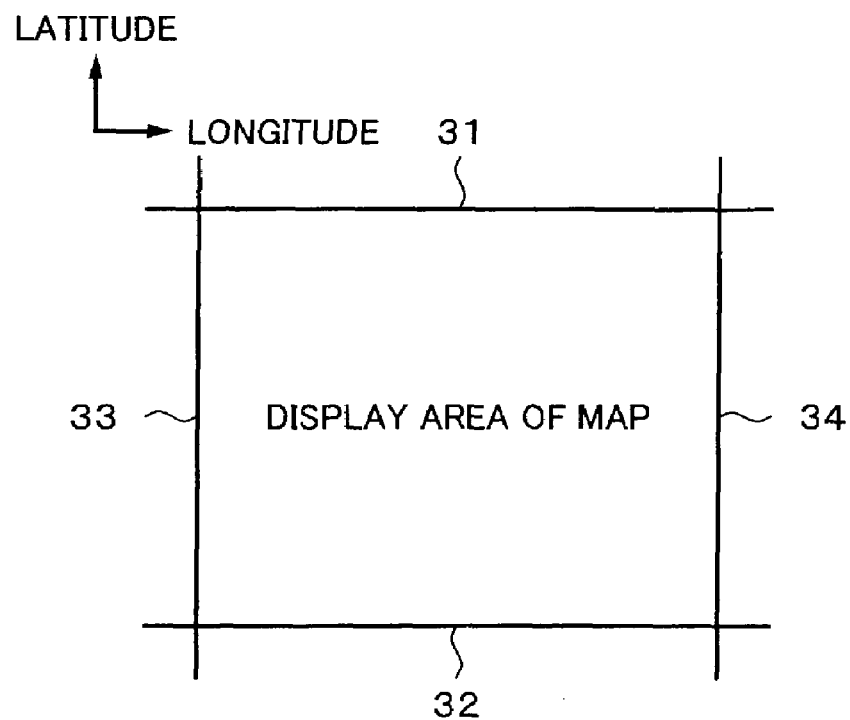
FIG. 11 is a schematic diagram showing an example of the latitude and longitude table formed in the embodiment of the invention.
FIG. 12 is a schematic diagram for explaining a process for displaying an icon in the embodiment of the invention.

An example of the latitude and longitude table of the position information which is formed from the position information file is shown in FIG. 11. A latitude 21, a longitude 22, and a category code 23 of the information which were obtained from the index information in the position information file and a file name 24 of the position information file are written in each line corresponding to one spot, respectively. (14000000) of the category code 23 in FIG. 11 denotes the photographing place, (01000000) of the category code 23 denotes a leisure spot, and (02000000) of the category code 23 denotes a restaurant, respectively. (dsc) in the file name 24 of the position information file shows position information fetched each time the shutter of the digital still camera is pressed. (nav) in the file name shows position information downloaded from a car navigation. The extension "poi" shows that the file is a file which conforms with the POIX.

After completion of creation of the latitude and longitude table, whether the latitudes and longitudes listed in the latitude and longitude table can be displayed on the map image displayed on the image display apparatus 103 or not is discriminated. As shown in FIG. 12, such a process is a process for discriminating whether the listed latitudes and longitudes can be displayed in a display area of a map surrounded by an upper side 31, a lower side 32, a left side 33, and a right side 34 or not in accordance with the flowchart shown in FIG. 13.

In step S31, whether each of the latitudes listed in the latitude and longitude table is smaller than the latitude of the upper side 31 of the display area of the map displayed on the image display apparatus 103 or not is discriminated. If it is determined that it is smaller than the latitude of the upper side 31, the control routine advances to step S32. If it is determined that it is not smaller than the latitude of the upper side 31, the control routine advances to step S36.

In step S32, whether each of the latitudes listed in the latitude and longitude table is larger than the latitude of the lower side 32 of the display area of the map displayed on the image display apparatus 103 or not is discriminated. If it is determined that it is larger than the latitude of the lower side 32, the control routine advances to step S33. If it is determined that it is not larger than the latitude of the lower side 32, the control routine advances to step S36.

In step S33, whether each of the latitudes listed in the latitude and longitude table is smaller than the latitude of the right side 34 of the display area of the map displayed on the image display apparatus 103 or not is discriminated. If it is determined that it is smaller than the latitude of the right side 34, the control routine advances to step S34. If it is determined that it is not smaller than the latitude of the right side 34, the control routine advances to step S36.

In step S34, whether each of the latitudes listed in the latitude and longitude table is larger than the latitude of the left side 33 of the display area of the map displayed on the image display apparatus 103 or not is discriminated. If it is determined that it is larger than the latitude of the left side 33, the control routine advances to step S35. If it is determined that it is not larger than the latitude of the left side 33, the control routine advances to step S36.

In step S35, an icon is displayed at the relevant position on the map image. If all discrimination results in steps S31, S32, S33, and S34 are YES as mentioned above, it is determined that the latitudes and longitudes listed in the table can be displayed on the map image. In step S35, the icon is displayed at the relevant position on the map image. If NO, the icon is not displayed on the map image.

Figure 14:
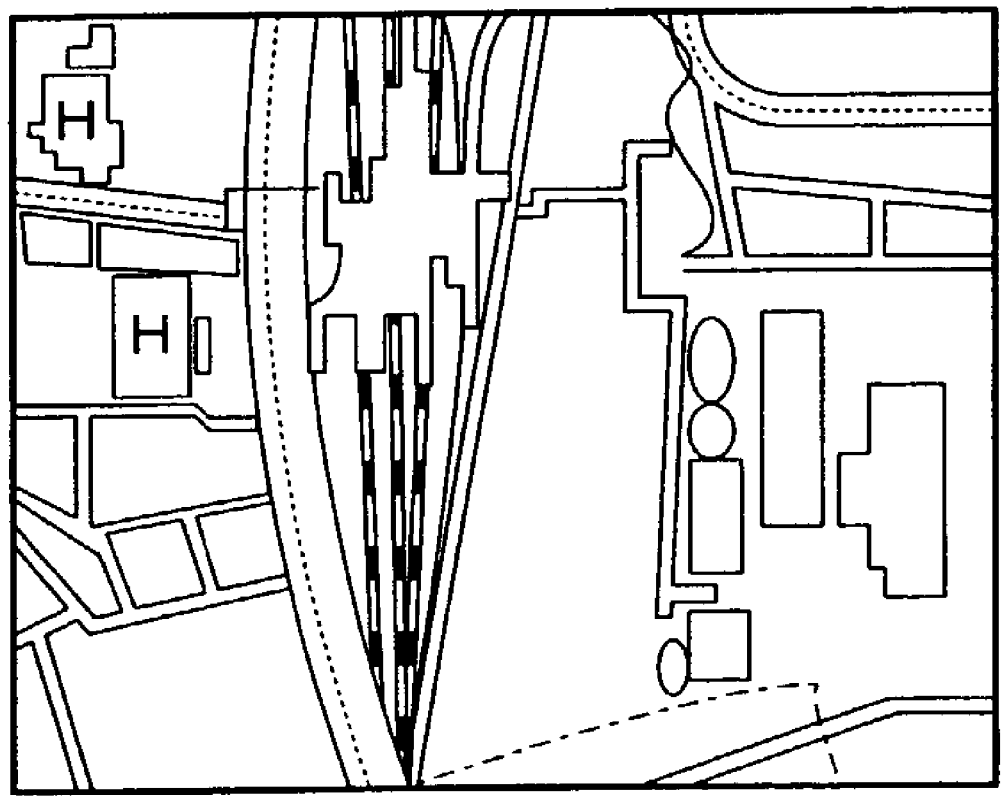
FIG. 14 is a schematic diagram of an example of a map image which is displayed in the embodiment of the invention.

In step S36, whether the latitudes and longitudes in which the discrimination is not finished still remain in the latitude and longitude table or not is discriminated. If it is determined that the latitudes and longitudes still remain, the control routine is returned to step S31. If it is determined that the latitudes and longitudes do not remain, the control routine of this flowchart is finished. An example of the map image which is displayed as mentioned above is shown in FIG. 14.

Figure 15:
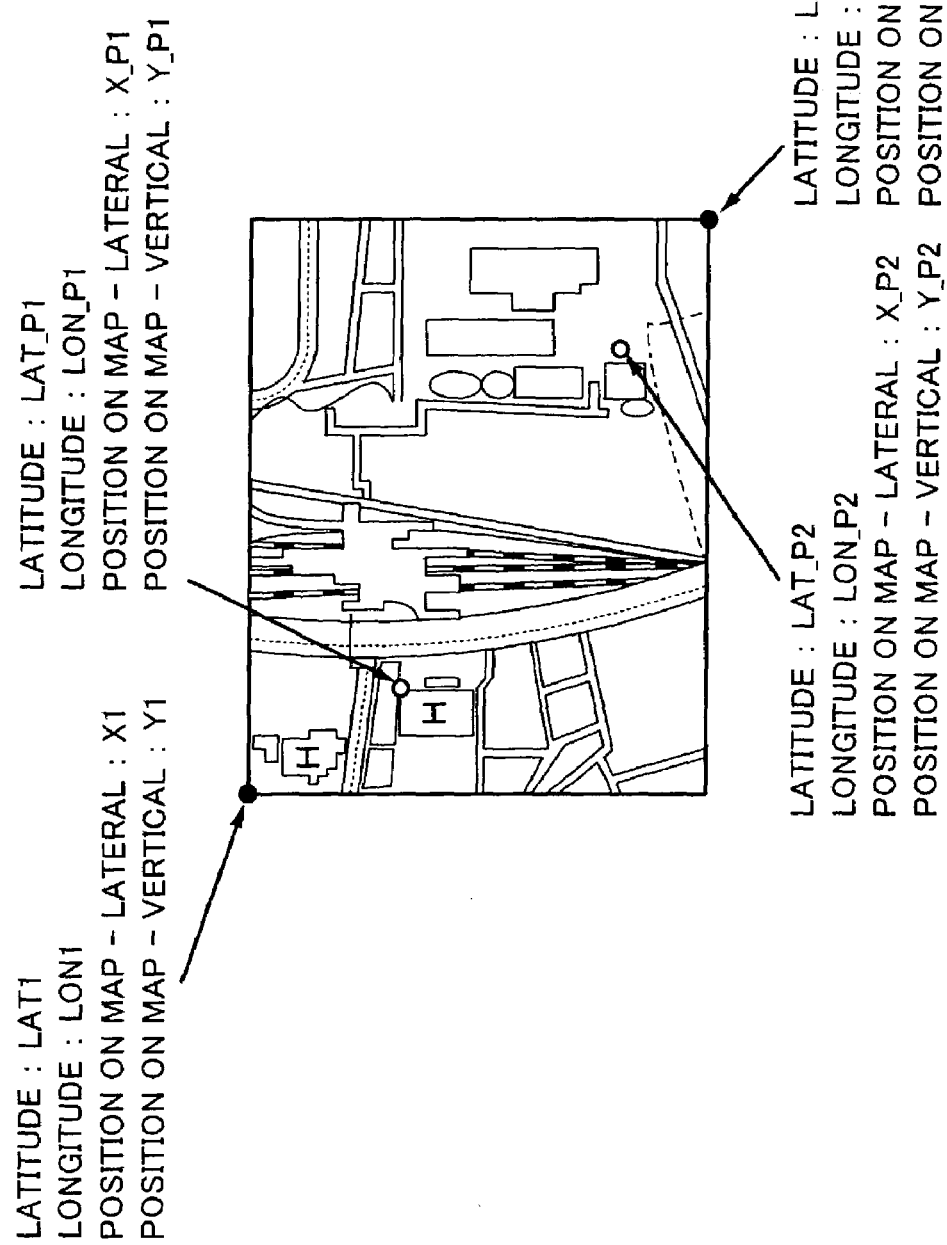
FIG. 15 is a schematic diagram for explaining a process for calculating a latitude and a longitude on a map image in the embodiment of the invention.

An example of a method of obtaining the latitudes and longitudes of the upper, lower, left, and right sides of the map image displayed in the display area from the latitudes and longitudes of the first and second points in the measured map image will now be described with reference to FIG. 15. FIG. 15 shows an example of a map image which is displayed. In the diagram, the upper side is directed due north. As shown in FIG. 15, the first point in the display area is assumed in the following manner. A latitude: LAT_P1. A longitude: LON_P1. A position on the map image displayed in the display area—lateral: X_P1. A position on the map image—vertical: Y_P1. The second point in the display area is assumed in the following manner. A latitude: LAT_P2. A longitude: LON_P2. A position on the map image displayed in the display area—lateral: X_P2. A position on the map image—vertical: Y_P2. From the first and second points, a latitude LAT1 and a longitude LON1 corresponding to the upper left position (a position on the map image—lateral: X1, a position on the map image—vertical: Y1) are calculated and a latitude LAT2 and a longitude LON2 corresponding to the lower right position (a position on the map image—lateral: X2, a position on the map image—vertical: Y2) are also calculated.

First, the latitude LAT1 and longitude LON1 corresponding to the upper left position on the map image displayed in the display area are calculated from the following equations (1) and (2).

$$LAT1 = \text{LAT\_P1} + \qquad (1)$$
$$(Y1 - \text{Y\_P1}) * (\text{LAT\_P1} - \text{LAT\_P2}) / (\text{Y\_P1} - \text{Y\_P2})$$

$$LON1 = \text{LON\_P1} - \qquad (2)$$
$$(\text{X\_P1} - X1) * (\text{LON\_P2} - \text{LON\_P1}) / (\text{X\_P2} - \text{X\_P1})$$

Subsequently, the latitude LAT2 and longitude LON2 corresponding to the lower right position on the map image displayed in the display area are calculated from the following equations (3) and (4) by using the calculated latitude LAT1 and longitude LON1.

$$LAT2 = \qquad (3)$$
$$LAT1 - (Y1 - Y2) * (\text{LAT\_P1} - \text{LAT\_P2}) / (\text{Y\_P1} - \text{Y\_P2})$$

$$LON2 = \qquad (4)$$
$$LON1 + (X2 - X1) * (\text{LON\_P2} - \text{LAT\_P1}) / (\text{X\_P2} - \text{X\_P1})$$

Figure 16:
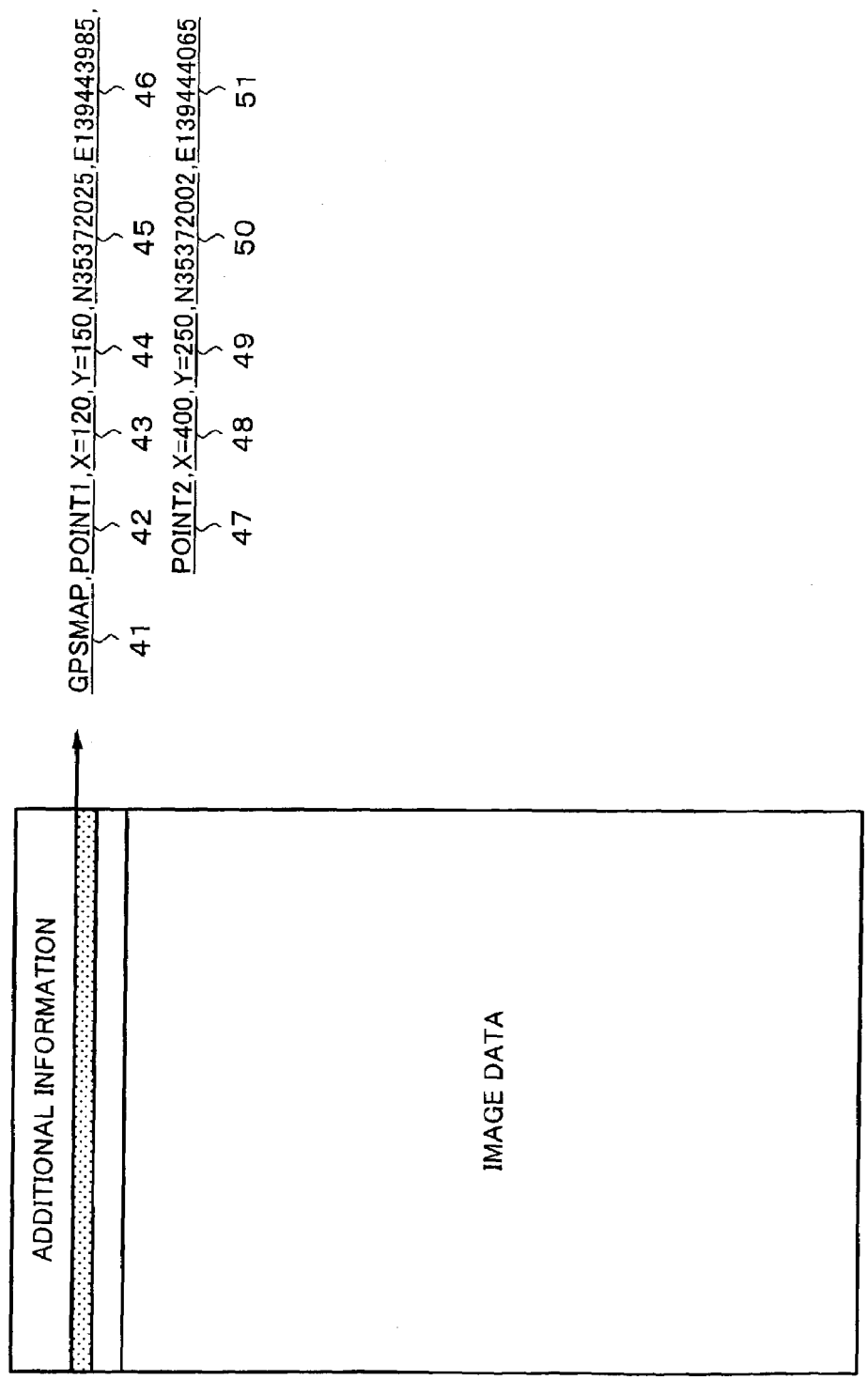
FIG. 16 is a schematic diagram for explaining a file format of an image in the embodiment of the invention.

As an example of a format of a map image file in which the latitudes and longitudes of the first and second points on the measured map image are recorded together with the image file, an example in which a JPEG image in an Exif (Exchangeable Image File format) 2.1 format is used is shown in FIG. 16. Reference numeral 41 in FIG. 16 denotes a beginning of the position information data of the map image; 42 a beginning of the information of the first point; 43 an X coordinate of the first point on the map image; 44 a Y coordinate of the first point on the map image; 45 a latitude of the first point; 46 a longitude of the first point; 47 a beginning of the information of the second point; 48 an X coordinate of the second point on the map image; 49 a Y coordinate of the second point on the map image; 50 a latitude of the second point; and 51 a longitude of the second point, respectively.

It is also possible to use the JPEG image in the Exif2.1 format in which the image which is displayed on the digital still camera and predetermined information can be recorded. An area called "Maker Note" where the image creator can freely describe is provided in the JPEG image in the Exif2.1 format. For example, the latitudes and longitudes of the first and second points and necessary information such as identifier indicative of the map image, draftsmanship by which the map is written, and the like can be recorded in "Maker Note".

Figure 20:
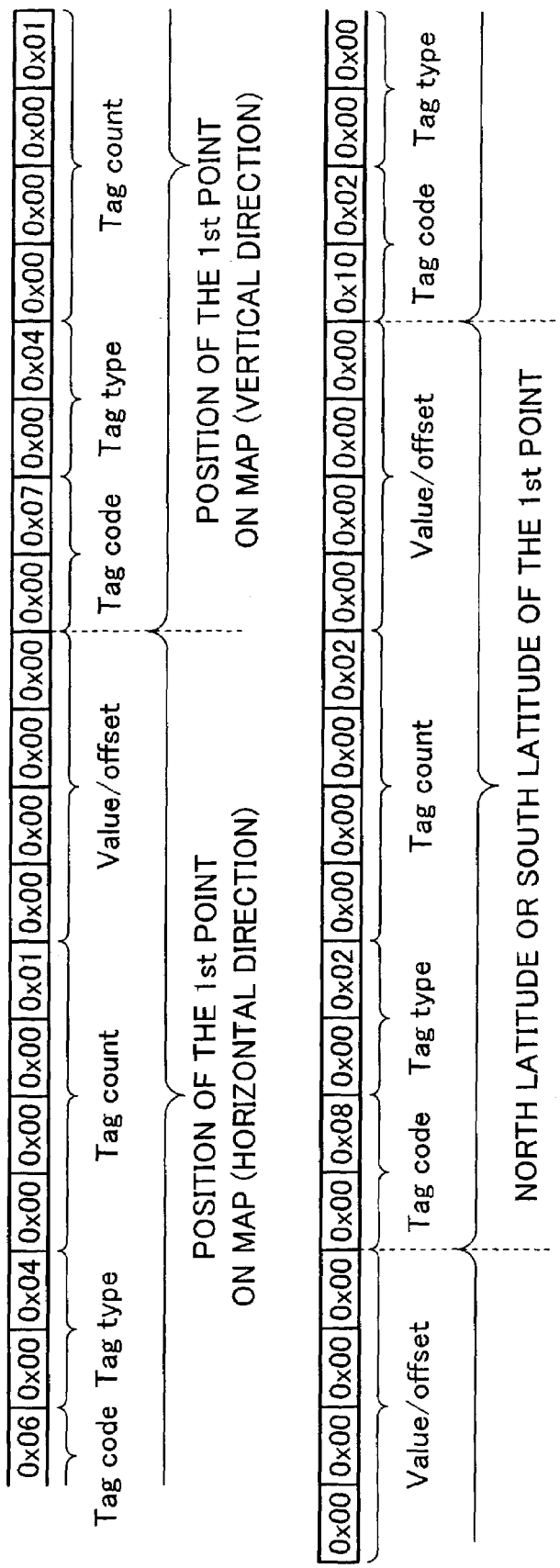
FIG. 20 shows another example of description of position information in the embodiment of the invention.

FIGS. 17 and 19 show examples of information which is recorded. FIGS. 18 and 20 show description examples in which the information is recorded. FIGS. 17 and 18 show the example in which the information is described in the ASCII format. FIGS. 19 and 20 show the example in which the information is described in the tag format. As a device for recording those information, a digital still camera for reproducing map images or an external device can be used.

Figure 21:
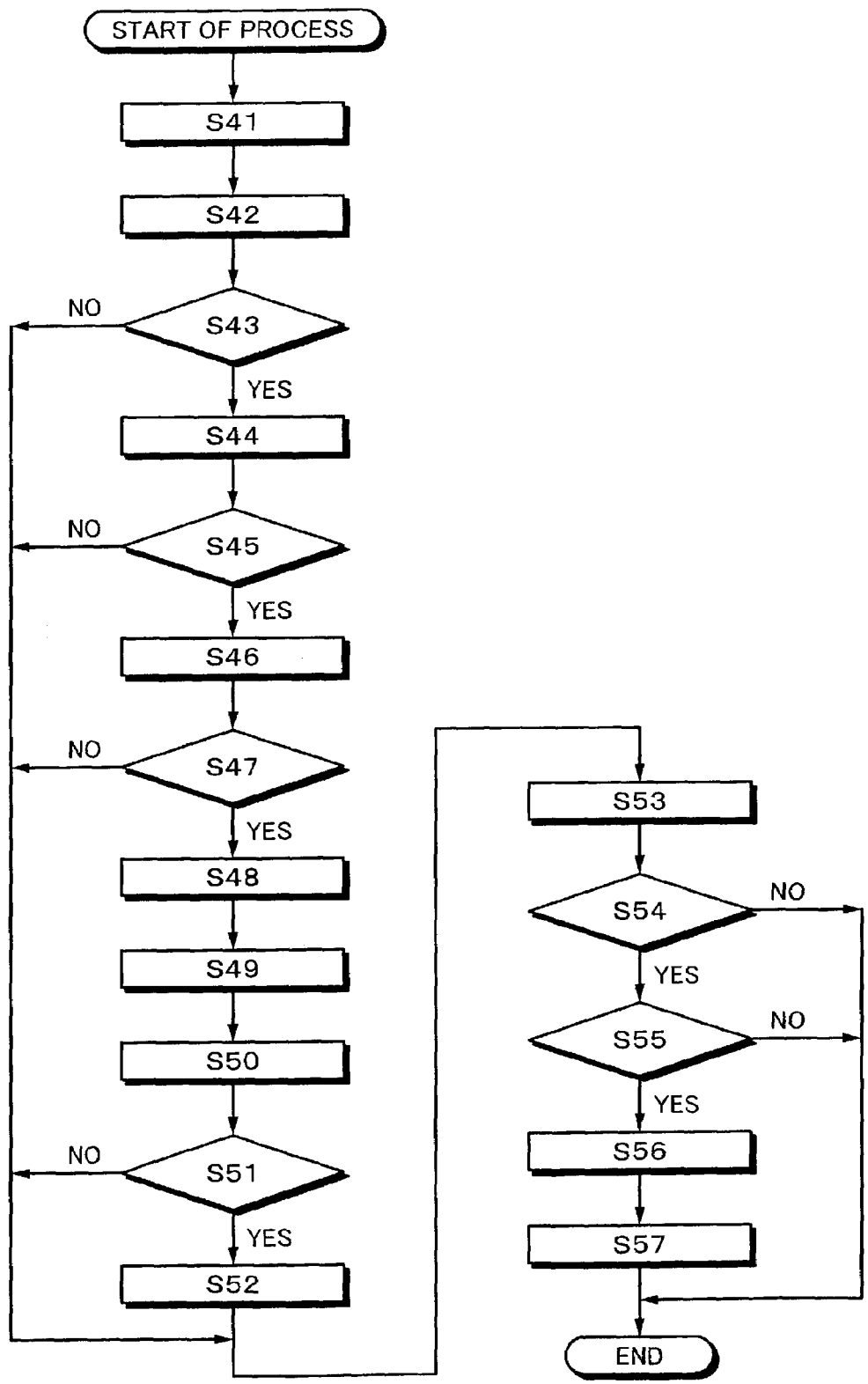
FIG. 21 is a flowchart for explaining a process for reproducing an image in the embodiment of the invention.

An example in which the JPEG image in the Exif2.1 format is reproduced from the memory card 108 and used will now be described with reference to a flowchart shown in FIG. 21. In step S41, a map image file of the JPEG image in the Exif2.1 format is read out from the memory card 108 by the memory card controller 107 and developed into the DRAM 104. Position information which can be displayed so as to overlap with the map image has been inputted to the memory card 108 and the position information is displayed onto the map image by points.

In step S42, a describing location of the position information is searched from the map image file developed in the DRAM 104. In step S43, whether the position information exists or not is discriminated. If it is determined that the position information exists, the control routine advances to step S44. If it is determined that the position information does not exist, the control routine advances to step S53.

In step S44, an identification number is searched from the map image file developed in the DRAM 104. In step S45, whether the ID number indicative of the map image format exists or not is discriminated. If it is determined that the valid ID number exists, the control routine advances to step S46. If it is determined that the valid ID number does not exist, the control routine advances to step S53.

In step S46, a version of the format of the map image file is confirmed. In step S47, whether the map image can be displayed or not is discriminated from the version of the format of the map image file. If it is determined that the map image can be displayed, the control routine advances to step S48. If it is determined that the map image cannot be displayed, the control routine advances to step S53.

In step S48, a format of the map image such as geodetic system, draftsmanship, or the like is obtained from the map image file. In step S49, the latitudes and longitudes of the first and second points are read out from the data in the DRAM 104. As mentioned above, in steps S42 to S49, the latitudes and longitudes of the first and second points and the position on the map image are read out from the header portion of the map image file recorded in the DRAM 104 by the microcomputer 105 for control.

In step S50, whether the latitudes and longitudes of the points which were read out lie within a valid range, that is, within the display area of the map image or not is confirmed. In step S51, whether the latitudes and longitudes of the points which were read out are valid position information or not is discriminated. If it is determined that they are the valid position information, the control routine advances to step S52. If it is determined that they are the invalid position information, the control routine advances to step S53.

In step S52, in order to enable each point to be used as a map image, the format of the map image file is converted into a degree unit of $1/10$ so that it can be used as a map image, and a map data flag is turned on. In step S53, the map image is displayed onto the image display apparatus 103. In step S54, whether the map data flag is ON or OFF is discriminated. If it is determined that the map data flag is ON, the control routine advances to step S55. If it is determined that the map data flag is OFF, the control routine of this flowchart is finished.

In step S55, whether the recorded position information data lies within the range of the map image which is at present being displayed or not, that is, whether the position information data to be displayed exists on the map image or not is discriminated. If it is determined that the position information data to be displayed exists on the map image, the control routine advances to step S56. If it is determined that the position information data to be displayed does not exist on the map image, the control routine of this flowchart is finished.

In step S56, the position of the position information data on the map image is calculated. Assuming that the number of pixels in the vertical direction of the display area is equal to Ym, the number of pixels in the lateral direction is equal to Xm, a latitude of the upper left position of the map image on the display area is set to LAT11, its longitude is set to LON11, a latitude of the lower right position is set to LAT12, and its longitude is set to LON12, respectively, a latitude of the position is assumed to be LAT10 and its longitude is assumed to be LON10. A position (y, x) on the display area in the case where the upper left position is set to an origin is given by the following equations.

$x=(LON10-LON11)/(LON12-LON11) \times Xm$ $y=(LAT10-LAT11)/(LAT12-LAT11) \times Ym$ In step S57, points of the position information data are displayed so as to be overlapped with the map image. The control routine of this flowchart is finished.

The position information data (first and second points) of the map image can be set to fixed points such as upper left point and lower right point or the like as shown in FIG. 7 mentioned above or can be also set to arbitrary points without being fixed as shown in FIG. 6 as mentioned above.

In the embodiment, the position information data of the first and second points of the map image has been written into the header of the map image file of the JPEG image in the Exif2.1 format as an example. However, an arbitrary format can be used as a file format so long as there is an area for writing the position information data. Similarly, the format of the image data is not limited to JPEG. Further, besides the digital still camera, the embodiment can be also applied to any portable apparatus having the function for reproducing the map image.

Although the invention has been described by using the digital still camera in the embodiment, the embodiment can be also applied to any apparatus which can digitally record/reproduce images.

Although the GPS receiver has been used for the method of obtaining the position information in the embodiment, the invention is not limited to the GPS receiver, but the operator can also directly input the position information. That is, it is sufficient that the position information can be inputted.

According to the invention, by giving the position information of the first and second points whose latitudes and longitudes are away from each other by a necessary distance to the map image serving as a map, latitudes and longitudes of all points on the map image can be calculated. Thus, a desired map can be used as a map image without taking a special procedure or making a special modification. For example, in case of an apparatus which can photograph digital images, a map such as tourist attraction guide map, vicinity map, or the like at hand can be photographed and used as a map, so that it is useful even in the case where an image serving as a map is not prepared. If draftsmanship of the map image is previously described, a latitude and a longitude can be more accurately calculated.

According to the invention, since a general format such as a POIX file or the like is used when the position information of the first and second points is recorded, information can be exchanged to/from another apparatus.

According to the invention, so long as the apparatus can display digital images, if there are a map image and position information data, the position information can be displayed so as to be overlapped with the map image.

According to the invention, if the image is a photographed image, a photographing position is displayed on the map image. If the image is an image for restaurants or an image for tourist attraction guide, since it is displayed at a predetermined position on the map image, which restaurant or tourist attraction exists is known.

According to the invention, so long as the apparatus can obtain latitudes and longitudes, since the map image and the present place can be displayed so as to overlap with each other, navigation can be realized.

According to the invention, so long as the apparatus can record digital images, by selecting the present place from the map image, latitude and longitude information of the photographing spot can be recorded onto the photographed image.

DESCRIPTION OF REFERENCE NUMERALS

41 BEGINNING OF POSITION INFORMATION DATA OF MAP IMAGE

42 BEGINNING OF INFORMATION OF THE 1st POINT

43 X COORDINATE OF THE 1st POINT ON MAP IMAGE
44 Y COORDINATE OF THE 1st POINT ON MAP IMAGE
45 LATITUDE OF THE 1st POINT
46 LONGITUDE OF THE 1st POINT
47 BEGINNING OF INFORMATION OF THE 2nd POINT
48 X COORDINATE OF THE 2nd POINT ON MAP IMAGE
49 Y COORDINATE OF THE 2nd POINT ON MAP IMAGE
50 LATITUDE OF THE 2nd POINT
51 LONGITUDE OF THE 2nd POINT
S1 MOVE TO THE 1st LAND MARK
S2 SET TO POSITION INFORMATION OBTAINING MODE OF THE 1st POINT
S3 SELECT PRESENT PLACE ON MAP
S4 RECORD SELECTED PRESENT PLACE ON MAP INTO DRAM
S5 OBTAIN LATITUDE AND LONGITUDE OF PRESENT PLACE BY GPS RECEIVER
S6 RECORD OBTAINED LATITUDE AND LONGITUDE OF PRESENT PLACE INTO DRAM
S7 MOVE TO LAND MARK OF THE 2nd POINT
S8 SET TO POSITION INFORMATION OBTAINING MODE OF THE 2nd POINT
S9 OBTAIN PRESENT PLACE ON MAP
S10 RECORD OBTAINED PRESENT-PLACE ON MAP INTO DRAM
S11 OBTAIN LATITUDE AND LONGITUDE OF PRESENT PLACE BY GPS RECEIVER
S12 RECORD OBTAINED LATITUDE AND LONGITUDE OF PRESENT PLACE INTO DRAM
S13 RECORD POSITION INFORMATION OF TWO POINTS RECORDED IN DRAM INTO MEMORY CARD
S21 READ MAP IMAGE DATA AND DISPLAY IT ONTO IMAGE DISPLAY APPARATUS 103
S22 READ POSITION INFORMATION FILE
S23 SEARCH INDEX TAG
S24 OBTAIN LATITUDE AND LONGITUDE BY INDEX TAG AND WRITE THEM INTO TABLE
S25 POSITION INFORMATION FILE REMAINS?
S31 LATITUDE<LATITUDE OF UPPER SIDE OF MAP?
S32 LATITUDE>LATITUDE OF LOWER SIDE OF MAP?
S33 LONGITUDE<LATITUDE OF RIGHT SIDE OF MAP?
S34 LONGITUDE>LATITUDE OF LEFT SIDE OF MAP?
S35 DISPLAY ICON AT RELEVANT POSITION ON MAP
S36 DATA REMAINS IN TABLE?
S41 DEVELOP MAP IMAGE FILE FROM MEMORY CARD ONTO DRAM
S42 SEARCH DESCRIBING LOCATION OF POSITION INFORMATION FROM DATA DEVELOPED ON DRAM
S43 POSITION INFORMATION EXISTS?
S44 SEARCH ID SYMBOL FROM DATA DEVELOPED ON DRAM
S45 VALID ID SYMBOL EXISTS?
S46 CONFIRM VERSTION OF FORMAT
S47 CORRESPONDING VERSION EXISTS?
S48 OBTAIN FORMATS OF MAP SUCH AS GEODETIC SYSTEM, DRAFTSMANSHIP, ETC.
S49 READ LATITUDES AND LONGITUDES OF THE 1st AND 2nd POINTS FROM DATA ON DRAM
S50 CONFIRM WHETHER READ-OUT LATITUDES AND LONGITUDES OF POINTS LIE WITHIN VALID RANGE OR NOT?
S51 VALID DATA?
S52 CONVERT FORMAT OF DATA SO THAT EACH POINT CAN BE USED AS MAP, AND SET MAP DATA FLAG TO ON
S53 DISPLAY MAP IMAGE
S54 MAP DATA FLAG IS ON?
S55 POSITION DATA TO BE DISPLAYED ON MAP EXISTS?
S56 OBTAIN POSITION OF POSITION DATA ON MAP BY CALCULATION
S57 DISPLAY POINT OF POSITION SO AS TO BE OVERLAPPED WITH MAP IMAGE

The invention claimed is:

1. A data recording apparatus which has a portable construction and records a digital image signal onto a recording medium, comprising:
   signal processing means for forming image data from an image pickup signal which is obtained from image pickup means;
   a display unit for displaying said image data;
   position selecting means for selecting a position on said image data displayed on said display unit and obtaining first position information regarding the selected position;
   position measuring means for obtaining second position information using a global positioning system (GPS) by measuring a position located at a distance from the selected position; and
   recording means for recording said first and second position information together with said image data onto said recording medium;
   wherein, when a power source for said data recording apparatus is turned off after said first position information is recorded onto said recording medium, the second position information is recorded when the power source is subsequently turned on.

2. A data recording apparatus according to claim 1, wherein said image data and said first and second position information are recorded as one file onto said recording medium.

3. A data recording apparatus according to claim 1, wherein said recording medium is detachable from said data recording apparatus.

4. A data recording method which has a portable construction and records a digital image signal onto a recording medium, comprising the steps of:
   forming image data from an image pickup signal which is obtained from image pickup means;
   displaying said image data onto a display unit;
   selecting a position on said image data displayed on said display unit and obtaining first position information regarding the selected position;
   obtaining second position information using a global positioning system (GPS) by measuring a position located at a distance from the selected position; and
   recording said first and second position information and said image data onto said recording medium;
   wherein, when a power source for said data recording apparatus is turned off after said first position information is recorded onto said recording medium, the second position information is recorded when the power source is subsequently turned on.

5. A data recording method according to claim 4, wherein said image data and said first and second position information are recorded as one file onto said recording medium.

6. A data recording method according to claim 4, wherein said recording medium is detachable from a data recording apparatus.

7. A data recording and reproducing apparatus which has a portable construction, records a digital image signal onto a recording medium, reproduces said digital image signal from said recording medium, and displays the signal, comprising:
- signal processing means for forming image data from an image pickup signal which is obtained from image pickup means or the digital image signal which is read out from said recording medium;
- a display unit for displaying said image data;
- position selecting means for selecting a position on said image data displayed on said display unit and obtaining first position information regarding the selected position;
- position measuring means for obtaining second position information using a global positioning system (GPS) by measuring a position located at a distance from the selected; and
- recording means for recording said first and second position information together with said image data onto said recording medium;
- wherein, when a power source for said data recording and reproducing apparatus is turned off after said first position information is recorded onto said recording medium, the second position information is recorded when the power source is subsequently turned on; and
- reading means for reading out said image data and said first and second position information data said recording medium,
- wherein said image data read out from said recording medium is displayed on said display unit.

8. A data recording and reproducing apparatus according to claim 7, wherein a predetermined mark is displayed to identify a predetermined position on said image data.

9. A data recording and reproducing apparatus according to claim 7, wherein said image data and said first and second position information are constructed as one file.

10. A data recording and reproducing apparatus according to claim 7, wherein said recording medium is detachable from said data recording and reproducing apparatus.

11. A data recording and reproducing method which has a portable construction, records a digital image signal onto a recording medium, reproduces said digital image signal from said recording medium, and displays the signal, comprising the steps of:
- forming image data from an image pickup signal which is obtained from image pickup means or the digital image signal which is read out from said recording medium;
- displaying said image data onto a display unit;
- selecting a position on said image data displayed on said display unit and obtaining first position information regarding the selected position;
- obtaining second position information using a global positioning system (GPS) by measuring a position located at a distance from the selected position;
- recording said first and second position information together with said image data onto said recording medium;
- wherein, when a power source for said data recording and reproducing apparatus is turned off after said first position information is recorded onto said recording medium, the second position information is recorded when the power source is subsequently turned on; and
- reading out said image data and said first and second position information from said recording medium,
- wherein said image data read out from said recording medium is displayed on said display unit.

12. A data recording and reproducing method according to claim 11, wherein a predetermined mark is displayed to identify a predetermined position on said image data.

13. A data recording and reproducing method according to claim 11, wherein said image data and said first and second position information are constructed as one file.

14. A data recording and reproducing method according to claim 11, wherein said recording medium is detachable from a data recording and reproducing apparatus.

* * * * *

UNITED STATES PATENT AND TRADEMARK OFFICE
CERTIFICATE OF CORRECTION

PATENT NO. : 7,184,611 B2 Page 1 of 1
APPLICATION NO. : 10/204657
DATED : February 27, 2007
INVENTOR(S) : Shiro Miyagi and Yuuko Mimura It is certified that error appears in the above-identified patent and that said Letters Patent is hereby corrected as shown below:

Column 3, Line 65 replace "is" with --are--.

Column 8, Line 4 replace "Instep" with --In step--.

Column 10, Line 21 replace "set every" with --set for every--.

Column 10, Lines 65 and 66 replace "latitudes" with --longitudes--.

Column 11, Lines 2, 4, 6, 7, 10 and 12 replace "latitudes" with --longitudes--.

Column 17, Line 21 replace "selected; and" with --selected position;--.

Signed and Sealed this

Seventh Day of August, 2007

JON W. DUDAS
*Director of the United States Patent and Trademark Office*